United States Patent [19]

Förster et al.

[11] 4,429,830

[45] Feb. 7, 1984

[54] SPACE AND UTILITY WATER HEATING SYSTEM

[75] Inventors: Siegfried Förster, Alsdorf; Peter Quell, Aachen, both of Fed. Rep. of Germany

[73] Assignee: Kernforschungsanlage Jülich GmbH, Jülich, Fed. Rep. of Germany

[21] Appl. No.: 254,092

[22] Filed: Apr. 14, 1981

[30] Foreign Application Priority Data

Apr. 14, 1980 [DE] Fed. Rep. of Germany ....... 3014180

[51] Int. Cl.³ .............................................. F24D 3/08
[52] U.S. Cl. .................... 237/19; 122/20 B; 237/8 R
[58] Field of Search ................... 237/19, 8 R, 16, 8 C; 122/20 B; 126/101

[56] References Cited

U.S. PATENT DOCUMENTS 4,065,054 12/1977 Meier .................................. 237/19

OTHER PUBLICATIONS

Kernforschungsanlage, "Ceramic Components For Thermal and Hydraulic Processes", 1980.

*Primary Examiner*—Albert J. Makay
*Assistant Examiner*—Henry Bennett
*Attorney, Agent, or Firm*—Karl F. Ross; Herbert Dubno

[57] ABSTRACT

A heating system for supplying utility water and a heating fluid for space heating purposes comprises a unit fired by a burner and having a recuperator traversed by the combustion gases and forming a first zone for heating the space-heating fluid and a second zone for heating the utility water. According to the invention, a heat exchanger is provided along the path of the utility water delivered from the second zone to a reserve tank and the heat exchanger is connected in a bypass across the feed and return lines of the heating fluid circulating path. A control responsive to the temperature in the tank regulates the flow through the bypass while a further temperature control responsive to the feed side temperature of the space-heating circulation path controls the fuel supplied to the burner and the rate of combustion gas flow through the heat exchanger.

7 Claims, 3 Drawing Figures

SPACE AND UTILITY WATER HEATING SYSTEM

CROSS REFERENCE TO RELATED APPLICATIONS

The present application is related to the concurrently filed copending application Ser. No. 253,258, filed Apr. 13, 1981 now abandoned for a "Fluid Heating Apparatus" and is also related to the commonly assigned copending application Ser. No. 100,634 of Dec. 5, 1979 (now U.S. Pat. No. 4,364,726) and Ser. No. 134,797 of Mar. 28, 1980 (now U.S. Pat. No. 4,376,627) as well as to application Ser. No. 250,765 filed Apr. 3, 1981 and entitled "Ceramic Burner Head", now abandoned and replaced by Ser. No. 398,797 of July 16, 1982.

FIELD OF THE INVENTION

Our present invention relates to a system of supplying hot water for consumption (utility water) and a circulating heating fluid for space heating, the latter forming part of, for example, a circulating-water heating system.

More particularly, the invention relates to a system of this type which utilizes a heating unit having a ceramic burner for gaseous or liquid fuels downstream of which a recuperator is provided to enable the abstraction of heat from hot combustion gases formed by the burner to heat the two fluids.

BACKGROUND OF THE INVENTION

In the copending application Ser. No. 253,258, a unique heating unit is described which can be formed as a unitary or monolithic all-ceramic body having a burner head at one end thereof, a combustion chamber downstream of the burner head, and a recuperator downstream of the combustion chamber in which two different fluids can be heated in successive zones.

As is pointed out in this application, a variety of heating systems having burners can be provided for the separate or combined heating of utility water and space-heating fluid (circulating water) utilizing either liquid or gaseous fuels and in which the fluid is heated by indirect heat exchange with hot combustion gases formed by the burner.

While such apparatus is provided in various sizes, configurations and heating capacities, it has been difficult heretofore to achieve high energy efficiency (high energy output with low fuel consumption) in a heating unit of small size, especially for the combined heating of utility water and the circulation of hot water of a space heating system.

The system described in the last-mentioned application greatly improves upon prior-art systems by forming the heating unit as a ceramic structure in which the burner head is a ceramic body having slit-like passages alternately fed with a combustion-sustaining medium such as air and with fuel, the air and fuel mixing at the burner mouth, or upon penetration of the fuel through porous walls between the passages, within the air passages.

This burner head is coupled with a ceramic recuperator body formed with slit-shaped channels, alternate ones of which pass the combustion gases while the others can be subdivided longitudinally into two zones for heating, in the upstream zone proximal to the burner chamber, the circulating hot water of the space heating system while the utility water is heated in the second zone.

This arrangement allows especially high energy efficiency to be obtained in a unit of small size, especially where both home-heating water and hot utility water are to be generated in the same unit.

Because the unit is composed of ceramic material, the combustion gases can be cooled during the indirect heat exchange process to temperatures below the dew points of these gases without creating any corrosion problems which might otherwise ensue because of the presence of acidic components in the combustion gases.

Other heating arrangements are known which occupy more space and thus have a lower volumetric efficiency or small energy output per unit of volume or weight and which also are less economical.

In these times of high energy cost, especially for liquid and gaseous fossil fuels, it is always of interest to improve the energy efficiency of a heating system.

OBJECTS OF THE INVENTION

It is the principal object of the present invention to provide an improved heating system capable of supplying both hot water for utility purposes and a hot circulating fluid, e.g. water, for space heating purposes which is energetically efficient, of low cost and of compact construction.

Another object of this invention is to improve the efficiency afforded by the system of application Ser. No. 253,258 when used to supply both utility water and circulating hot water in a heating system.

It is also an object of our invention to extend the principles of the previously identified applications to home heating and domestic water supply systems.

SUMMARY OF THE INVENTION

These objects and others which will become apparent hereinafter are attained, in accordance with the present invention, in a heating system of the type in which a fuel-fired burner generates hot combustion gases in a combustion chamber and these combustion gases are passed in indirect heat exchange in preferably successive zones with the circulating fluid of a space-heating system, e.g. a circulating hot water system, and hot water for utility purposes.

According to the invention, the hot water from the second zone is passed through a heat exchanger before this hot water enters a reserve or hot water storage tank. The heat exchanger is of the indirect heat-transfer type and its other section is connected in a bypass between the feed and return lines of the circulating path for the space-heating fluid, the system also including a first control responsive to the temperature of the water tank for regulating the throughput rate of the bypass, and a second control responsive to the temperature in the feedline of the circulating system for controlling the rate at which fuel is supplied to the burner and/or the rate at which the hot gases are passed through the two zones.

It has been found that this system affords a unique approach to seasonal variations in the space heating and domestic water requirements of a domicile and thus allows a maximum abstraction of heat per unit of fuel consumed. Advantageously, the burner and recuperator unit is of the type described in application Ser. No. 253,258.

More particularly, the heating unit comprises a ceramic burner head, e.g. as described in applications Ser. No. 100,634 (U.S. Pat. No. 4,364,726) and Ser. No. 134,797 (U.S. Pat. No. 4,376,627), as well as in application Ser. No. 250,765, of the type having mutually parallel slit-shaped flow passages formed in a unitary ceramic burner head body with fuel passages alternating with passages for the oxidizing agent or the combustion-sustaining agent, e.g. air, the air and fuel passages being separated by thin ceramic partitions enabling heat exchange between them, diffusion of the fuel into the air passages and/or evaporation of a liquid fuel into the air passages when these partitions are porous, utilizing the principles of these copending applications which are hereby incorporated in their entireties by reference.

The burner mouth opens into a combustion chamber which can also be defined by ceramic walls, this combustion chamber, in turn, communicating with slit-like passages in a ceramic recuperator body. These passages can extend the full length of the recuperator body and can be equal in number to the fuel or air passages of the burner head or of a differing number and width, the combustion chamber affording uniform distribution of the combustion gases to the slit-like passages of the ceramic recuperator body.

The combustion gas passages of this body alternate with or flank, via ceramic partitions unitary with the ceramic recuperator body, like slit-like passages through which a fluid to be heated is passed. The fluid to be heated preferably is passed in a counterflow to the combustion gases so that the indirect heat exchange through the ceramic recuperator partitions transfers heat to this fluid.

The oxidizing agent and the fuel can be passed in concurrent (uniflow) directions through the respective slit-like passages to the burner mouth and are discharged at this mouth in an ignitable mixture. Any conventional ignitable-mixture igniter, e.g. sparking electrodes, can be provided in the combustion zone and the result is a short flame region immediately downstream of the burner mouth.

The use of a ceramic recuperator in combination with a ceramic burner head and a combustion chamber which can be defined by ceramic walls, permits the temperature in the combustion chamber to be maintained extremely high, e.g. at levels above 1000° C. and the combustion gases to flow into the corresponding passages of the recuperator body at temperatures in excess of 1000° C. without damage of the parts of the device because of the refractory nature of the ceramic bodies.

However, the combustion gases can be cooled below their dew point as they traverse the recuperator since there is no danger of corrosion to the ceramic material and any liquid which is formed can be carried away without difficulty.

Ceramic burner heads of the type which may be used in accordance with the present invention can also be found in German patent document No. 28 53 309 as well as in German patent No. 2 707 290.

The burner head and the recuperator are preferably connected together into a unitary ceramic block, e.g. by bonding, bodies formed with the slit-like passages and constituting the burner heads and the recuperator between a pair of ceramic plates which can also define two opposite walls of the combustion chamber.

The entire heating unit thus is in the form of a easily handled compact monolithic structure which occupies significantly smaller space than earlier devices of a similar output.

To minimize heat loss from the combustion chamber, the walls of the chamber can be formed of thermally insulating plates of a porous ceramic material. These heat insulating plates may be provided as internal or external layers lining the walls of the combustion chamber.

The recuperator can be constructed such that a portion of the burner air is bypassed through selected passages in the recuperating body for preheating by indirect heat exchange with the combustion gases.

This preheating of the combustion air has been found to be especially effective when liquid fuels are used since the thermal energy carried by the combustion air can be exploited to promote evaporation of the fuel.

The recuperator body is preferably divided into two heat exchange zones traversed in succession by the hot combustion gas. The first zone, i.e. the zone proximal to the combustion chamber, is used for space heating purposes in this region in that fluid heating passages can be traversed by a domestic heating fluid, e.g. water in the case of a hot-water circulating home heating system. In the next heat exchange zone in which the heating gas is brought to a temperature below its dew point, the fluid-heating passages can be traversed by the domestic hot water for utility purposes.

It has been found to be advantageous to avoid the boiling of the home-heating fluid and to provide increased heat exchange for this fluid by providing, at least toward the outlet side of each of the fluid-heating passages of the first zone, means for increasing the path length of the heating water, e.g. in the form of baffles defining a meandering path with pattern. These baffles are located at the side of the recuperator body at which the hot gases enter the hot gas passages.

It has also been found to be advantageous to provide wall supports in the fluid-heating and gas-cooling passages or channels, these supports being spaced apart in the height of each chamber and being formed at least in the vicinity of the inlet and outlet for the fluid to be heated with apertures enabling the fluid to pass beyond the support.

This arrangement has the advantage that it allows a considerable pressure differential to be sustained between the combustion gas and the fluid to be heated, i.e. across the partitions separating the slit-like channels for the combustion gases and the fluid to be heated.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
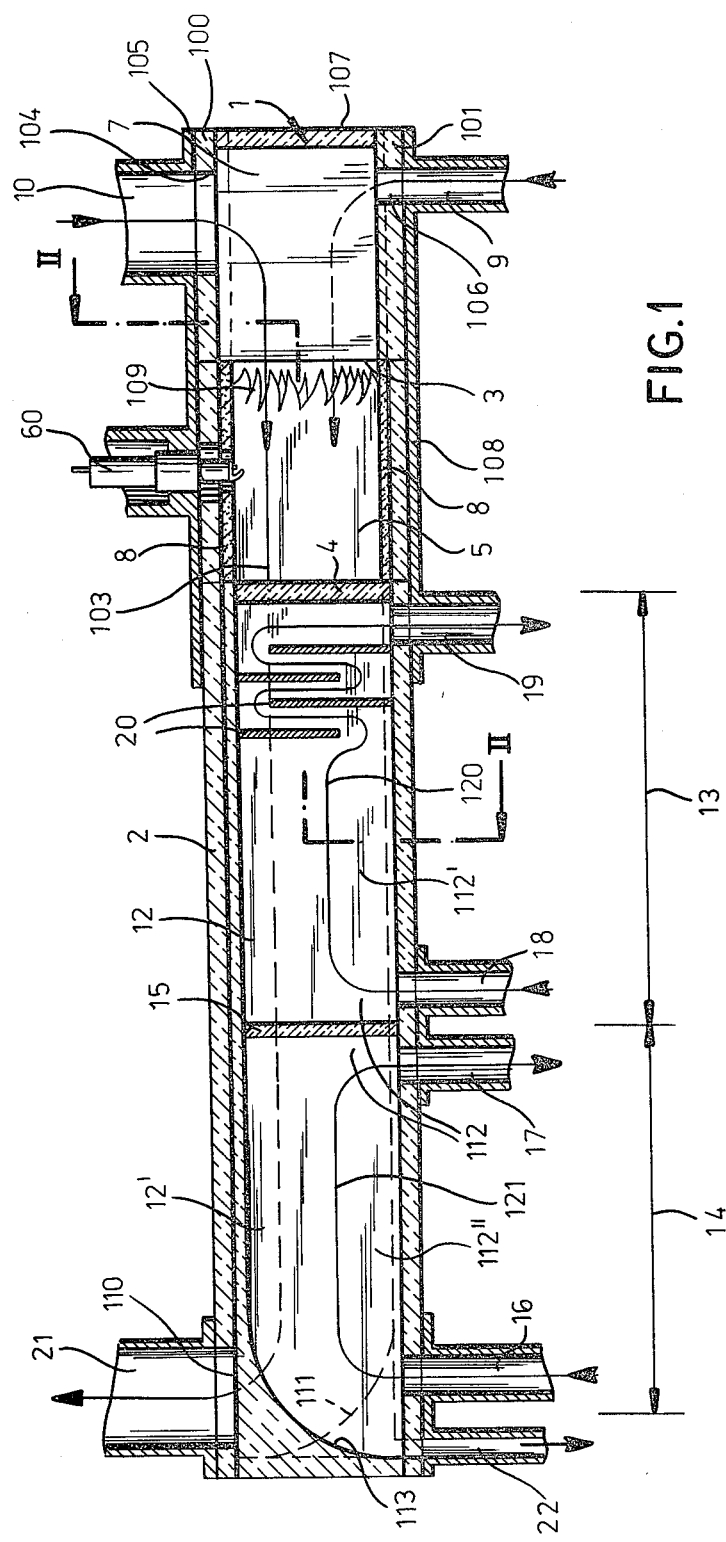
FIG. 1 is a longitudinal section through a heating unit with a ceramic burner head, a ceramic recuperator and two heat exchange zones, the section being taken along the plane represented by the section line I—I in FIG. 2.
Figure 2:
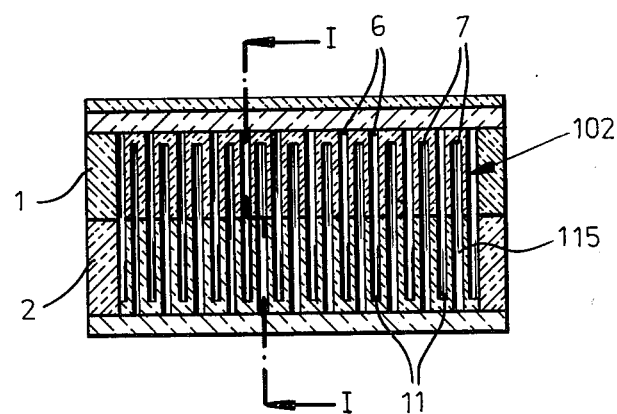
FIG. 2 is a transverse section partly through the burner head and partly through the recuperator of FIG. 1 along the section line II—II thereof.
Figure 3:
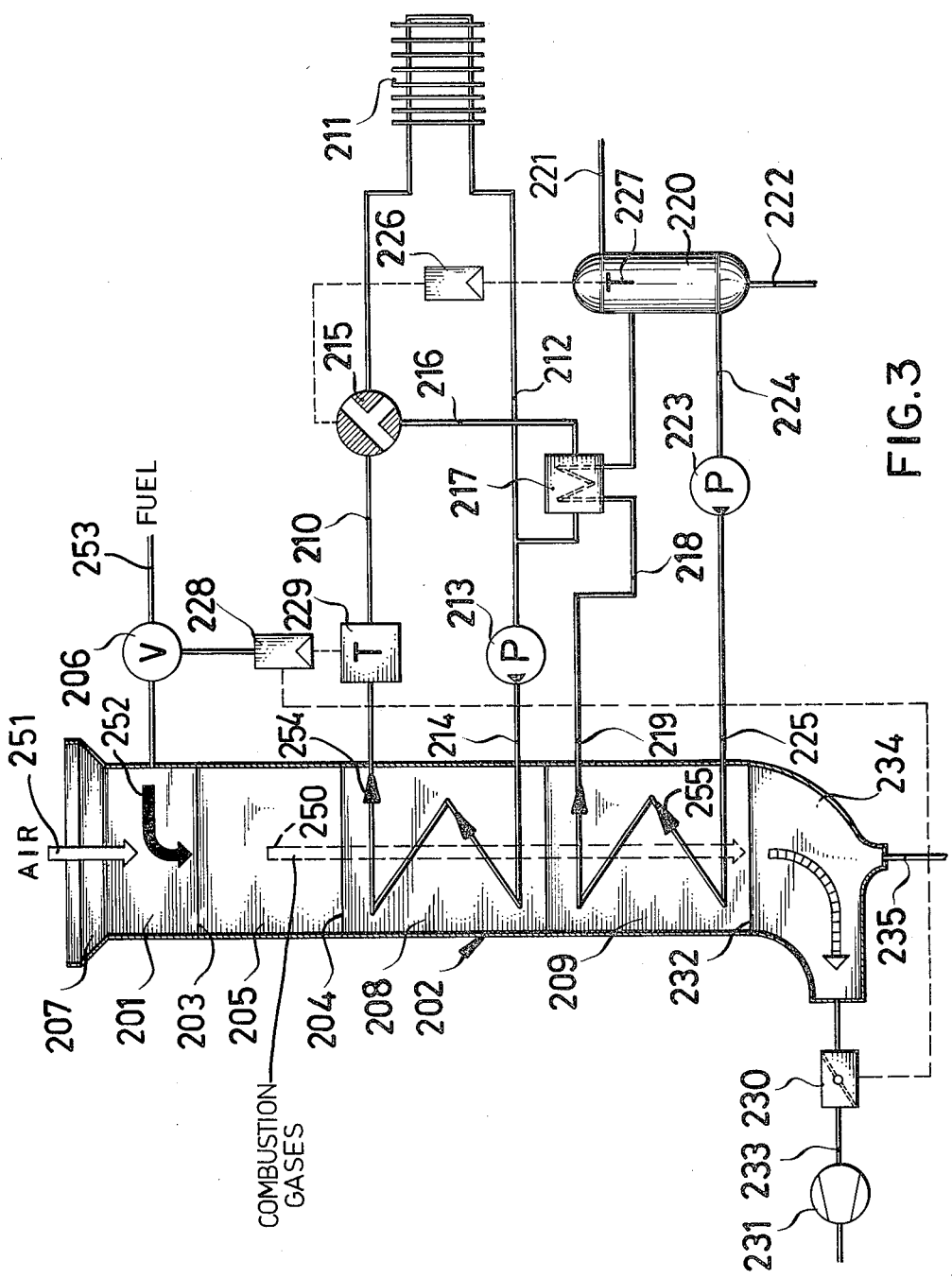
FIG. 3 is a flow diagram illustrating the principles of the invention with, for example, the heating unit of FIGS. 1 and 2.

The heating system of the invention shown in detail in FIG. 3, utilizes a heating unit as shown in FIGS. 1 and 2 (see application Ser. No. 253,258, hereby incorporated in its entirety by reference).

The burner head shown in FIGS. 1 and 2 at 1 is comprised of ceramic material and can be formed as a block of such material provided with slits which extend parallel to one another and alternately open on opposite sides of the block where the block is closed by upper and lower plates 100 and 101, also of ceramic material. The plates 100 and 101 may be bonded to the body 102 of ceramic material forming the burner head by a ceramic slit to ensure ceramic monolithic bonding.

The plates 100 and 101 extend the full length of the device and also are bonded to and received between them a similarly shaped ceramic recuperator 2 so that the entire assembly of the burner head, recuperator and a combustion chamber 5 between the two slit blocks forms a single unitary ceramic structure.

The relatively short combustion chamber 4 is thus disposed between the burner mass 3 of the burner head 1 and the hot gas inlet side 4 of the recuperator 2. The hot gas flow path through the burner chamber is represented by arrow 103 and through the two zones of the recuperator at 12 and 12'.

An igniter 60 projects into the combustion chamber to generate a spark or other electrical discharge for initially igniting the combustible mixture.

As described, the burner head 1 and the recuperator 2 are both formed with a multiplicity of parallel flow passages of slit-shaped cross sections which are uniformly distributed over the width of the respective bodies (FIG. 2) and are shown to have identical distributions in the upper and lower halves of this figure.

These flow passages include channel 7 for the fuel which is delivered to the slits of the body 1 which opened upwardly through an elongated distribution aperture 106 in the plate 101, the aperture 106 communicating with a duct 9 in a metallic plate 108 bonded to the plate 101.

The downwardly open slits of the burner head form channels 6 which communicate with the slit-like opening 106 in the plate 100 underlying the block forming the burner head.

All of the channels are closed at their right hand side as represented at 107 and the combustion air is delivered by a duct 10 formed on a metal plate 105 bonded to the ceramic plate 100.

At the burner mouth 3, the fuel and the air intensively mix and in a short flame front 109 generate a hot combustion gas within the chamber 5 which can effectively be filled with this flank if desired.

To minimize heat losses the interior of the combustion chamber 5 is lined with insulating plates 8 of gas impermeable porous ceramic material. The ducts 9 and 10 open laterally into the burner head 1.

The ceramic recuperator 2 is formed with flow passages 11 for the hot gas in the form of upwardly open slits which are covered by the plate 100 over substantially the entire length of the recuperator body 2, except at the left hand therefore where these channels open into an elongated aperture 110 of plate 100. This aperture is connected to a duct 21 at which the exhaust gas is discharged.

Alternating with the passages 11 are slit-like passages 112 for the medium to be heated. As can be seen in FIG. 1, the passages 112 are closed at their left hand end by the walls 113 while the passages 11 are closed at this end by the wall 111.

In addition, the passages 112 are each subdivided by a partition 115 so that the recuperator has two heating zones 13 and 14. In the recuperator, the heat is transferred through each wall 115 (FIG. 2) thereby heating the medium in the channels 112 with heat transferred from the combustion gas from channels 11.

In the embodiment of FIGS. 1 and 2, the first heat exchange zone 13 of the recuperator serves to heat the circulating heating fluid space heating, i.e. water in the case of hot water heating. The water is introduced into the passages 112' which are formed between the partitions 15 and the walls 4 in the channels 112 as represented by the arrow 120, i.e. in counterflow to the hot gas stream.

In the second heat exchange zone 14 downstream from the first in the direction of hot gas flow, the utility water for the house is heated. In this case as well, the passages 112" are traversed by the water in the direction of arrow 121 in counterflow to the hot gas.

Thus a water inlet 16 is mounted upon the unit to communicate with the downstream ends of all of the channels 112 while a hot water outlet 17 downstream of the partitions 15 is connected to the hot-water reserve tank.

On the opposite side of the partitions 15 the circulating heating water is introduced via an inlet 18 connected to the return side of the circulating hot water system. The feed side of this system is connected to the outlet 19 which communicates with the channels 112 immediately downstream of the walls 4 which separate these channels from the combustion chamber 5.

To avoid local boiling of the hot water and thereof at the outlet 19, the passages 112 are provided at least in the region of the water outlets with baffles 20 extending alternately into the passages from opposite sides.

FIG. 3 shows the system of this invention utilizing the ceramic unit of FIGS. 1 and 2. In this FIGURE the burner head is represented at 201 and has its mouth 203 opening into a combustion chamber 205 with which the inlet 204 of the recuperator body 202 communicates. This structure is a unitary ceramic body as has previously been described.

The recuperator 202 is subdivided into a first zone 208 and a second zone 209 whose hot-gas channels, in the form of slit-like passages are traversed in succession by the hot gases from the combustion chamber 205 as represented by the arrow 250.

An air inlet 207 communicates with alternate ones of the slit-like passages of the burner head 201 to admit air as the combustion-sustaining gas (arrow 251), while fuel is supplied as represented by arrow 252 to the remaining passages of the burner head via a fuel line 253 and a fuel-monitoring valve 206.

As described in application Ser. No. 253,258, this fuel can be a liquid fuel in which case the air is preferably preheated and only the air passages of the burner head open into the combustion chamber 205, the partitions between the air and fuel passages being composed of fuel-permeable porous ceramic material. In this case, the fuel penetrates the porous walls and evaporates on the surfaces defining the air passages to form the fuel/air mixture.

Of course, when the fuel is a gas, such as natural gas, both the fuel and the air passages can open into the combustion chamber to form the flame front at the mouth 203.

The first zone 208 serves to heat circulating water of a circulatory hot water heating system whose space heaters are represented by the radiator 211. The hot water flows in the direction of arrow 254, i.e. counterflow to the hot combustion gas, through the fluid heating passages of the zone 208. The utility water passes through the fluid heating channels of zone 209 in the direction of arrow 255.

From the first zone 208, the hot water is fed, in the region of the inlet side 204 of the recuperator body, to the feedline 210 of the hot water circulating system and then to the space heaters 211 before traversing the return line 212 and a circulator pump 213 to the line 214 opening into zone 208.

According to the invention, between feedline 210 and return line 212 there is provided a bypass 216 having a three-way valve 15 which can regulate the flow through the bypass 216 and to the radiators 211.

The bypass 216 extends through one compartment of an indirect heat exchanger 217 whose other compartment is traversed by the water in line 218 running from the hot end 219 of the zone 209 to the storage tank 220. Fresh water is delivered to this hot water storage tank via a line 222 while hot water is withdrawn at the top of this tank by a pipe 221. The hot water is circulated continuously by a pump 223 whose intake is connected at 224 to the bottom of the tank 220. The discharge side of the pump 223 is connected by the line 225 to the intake side of the water passages of zone 209.

Thus when space heating is not required, the circulator-pump 213 merely passes water through zone 208 and the bypass 216 via the heat exchanger 217 to supplement the hot water heating in zone 209 and the unit operates with a lower fuel rate. Conversely, when space heating is required, the bypass 216 can be cut off, e.g. when the hot water temperature in the tank is sufficient, to deliver all of the circulated water from the pump 213 to the radiators 211. Intermediate conditions are also accommodated by the system.

The system can be automatically controlled by a first controller 226 which responds to the temperature in the tank 220 via a thermostat 227 to control the valve 215.

A second thermostat 229 responds to the temperature in the feedline 210 and via the controller 228 can adjust the fuel feed via valve 206 or the combustion gas flow rate via a throttle flap 230 which can be provided in a duct 233 connecting a suction blower 231 with the gas outlet side 232 of the recuperator 202. The hood or transition piece 234, forming a pan, is connected to the duct 233, can be composed of ceramic and has a condensate outlet 235.

This control of the combustion gas throughput of course also regulates the air supply rate. The gases are cooled in zone 209 below the dew point temperature to form the condensate which is discharged at 235.

The controller 228 establishes an operating period enabling the unit to be fired for a predetermined convenient time to provide the heat and hot water for, say, average conditions in cold weather. When the hot water consumption is excessive, thermostat 227 responds and the heat exchanger 217 transfers heat from zone 208 to the hot water entering the tank. It has been found to be advantageous to cool the combustion gas at the end of zone 208 practically to or below its dew point and thereby avoid any possibility that the temperature of the water in zone 209 will exceed its boiling point so that the circulation by pump 223 will not be interrupted by gas lock or the like.

We claim:

1. A heating system comprising:
   a heating unit including a fuel-fired burner, a combustion chamber in which a hot combustion gas is generated by said burner, and a recuperator through which said gas is passed in at least a first and a second zone in indirect heat exchange with a recirculatable space heating fluid and hot utility water, respectively;
   means including a feedline connected to a high-temperature end of said first zone, at least one space heater connected to said feedline, at least one return line connected to said space heater, and a circulator forming a circulation path for said space-heating fluid through said first zone;
   means including a hot water storage tank and a pump for circulating hot water between said tank and said second zone for circulating hot water;
   a heat exchanger having two sections in heat exchanging relation with one another;
   means forming a bypass through one of said sections between said feedline and said return line, and at least one valve for controlling the flow through said bypass, said means for circulating hot water between said tank and said second zone including the other section of said heat exchanger;
   first control means responsive to the temperature of water in said tank for controlling said valve; and
   second control means responsive to the temperature in said feedline for controlling the rate of fuel flow to said burner and the rate of flow of said gas through said recuperator.

2. The system defined in claim 1 wherein said space heating fluid is water which is circulated through said first zone in counterflow to the direction of flow of said combustion gas therethrough.

3. The system defined in claim 2, further comprising suction means for drawing said combustion gases through said recuperator.

4. The system defined in claim 2 wherein said unit comprises:
   a ceramic burner body formed with a plurality of parallel slit-like passages at least some of which open at a side of said body;
   means for supplying a fuel to alternate ones of said passages of said burner body and for supplying air to the remainder of said passages whereby a combustible gas mixture is formed at said side of said body;
   means defining a combustion chamber at said side of said body and into which said some of said openings discharge whereby said hot combustion gas is formed in said combustion chamber; and
   a ceramic recuperator body formed with mutually parallel slit-like channels, alternate ones of said channels communicating with said combustion chamber for conducting said hot combustion gases therefrom, said water in each zone passing through others of said channels in a direction counter to the flow of said combustion gas for heat exchange between said water and said combustion gases through walls of said recuperator body between said channels.

5. The system defined in claim 4 wherein said ceramic burner body, said recuperator body and the means forming said combustion chamber are part of a unitary ceramic structure.

6. The system defined in claim 4, further comprising insulating layers of porous ceramic material lining said combustion chamber.

7. The system defined in claim 4, claim 5 or claim 6, further comprising baffles in water-carrying channels of said first zone proximal to said combustion chamber for deflecting the water flow along an increased path length.

* * * * *